United States Patent
Osa

(10) Patent No.: US 9,547,806 B2
(45) Date of Patent: Jan. 17, 2017

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Kinya Osa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 14/224,555

(22) Filed: Mar. 25, 2014

(65) Prior Publication Data

US 2014/0297707 A1    Oct. 2, 2014

(30) Foreign Application Priority Data

Apr. 1, 2013  (JP) ................................. 2013-076455

(51) Int. Cl.
| | |
|---|---|
| *G06F 17/11* | (2006.01) |
| *G06K 9/62* | (2006.01) |
| *G06F 17/18* | (2006.01) |

(52) U.S. Cl.
CPC ............. *G06K 9/6269* (2013.01); *G06F 17/18* (2013.01); *G06K 9/6287* (2013.01)

(58) Field of Classification Search
None
See application file for complete search history.

(56) References Cited

U.S. PATENT DOCUMENTS

| | | | | |
|---|---|---|---|---|
| 5,892,847 | A  * | 4/1999 | Johnson ................. | H04N 19/30 375/E7.04 |
| 8,005,862 | B2 * | 8/2011 | Zwol ................. | G06F 17/30017 707/791 |
| 2008/0152217 | A1* | 6/2008 | Greer ....................... | G06N 3/04 382/155 |
| 2011/0301447 | A1* | 12/2011 | Park ...................... | G06T 7/0016 600/407 |

(Continued)

OTHER PUBLICATIONS

Maji et al., "Classification using Intersection Kernel Support Vector Machine is Efficient", In IEEE Conference on Computer Vision and Pattern Recognition, 2008, pp. 1-8.

(Continued)

*Primary Examiner* — David H Malzahn
(74) *Attorney, Agent, or Firm* — Carter, DeLuca, Farrell & Schmidt, LLP

(57) ABSTRACT

There is provided an information processing apparatus. A multidimensional input vector is input. For each dimension of the input vector, a function value of a single-variable function with an element of the dimension as a variable is derived, by referring to a lookup table indicating a correspondence between a variable and a function value of the single-variable function. A product of the single-variable functions approximates a function value of a multiple-variable function. For each dimension of the input vector, a product of the function value derived by the derivation unit and a predetermined coefficient corresponding to the dimension is calculated. A value calculated using the total of the products calculated by the product calculation unit for each dimension of the input vector is output as a classification index indicating a class of the input vector.

13 Claims, 6 Drawing Sheets

(56) References Cited

U.S. PATENT DOCUMENTS

2014/0297707 A1* 10/2014 Osa ..................... G06K 9/6269
                                                    708/443

OTHER PUBLICATIONS

Vedaldi et al., "Efficient Additive Kernels via Explicit Feature Maps", In IEEE Conference on Computer Vision and Pattern Recognition, IEEE Transactions on Pattern Analysis and Machine Intelligence, vol. XX, No. XX, Jun. 2011, pp. 1-14.

* cited by examiner

INFORMATION PROCESSING APPARATUS, INFORMATION PROCESSING METHOD AND STORAGE MEDIUM

BACKGROUND OF THE INVENTION

Field of the Invention

The present invention relates to information processing apparatuses, information processing methods, and storage media.

Description of the Related Art

Classification using support vector machines (SVMs) is employed in a variety of applications and fields, such as image recognition. Regression calculations using support vector regression (SVR) are also employed in such fields. Assuming an input vector to be classified is represented by x, a support vector is represented by $x_i$ (where i=1, 2, ..., n), and a kernel function for vectors x and y is represented by K(x, y), an SVM classification function f(x) can be expressed by Formula (1).

$$f(x) = \sum_{i=1}^{n} \alpha_i y_i K(x, x_i) + b \quad (1)$$

Here, $y_i$ is a supervisory label corresponding to $x_i$, whereas $\alpha_i$ and b are parameters determined through learning.

Various types of functions are used as the kernel function K(x, y), such as a linear kernel, a polynomial kernel, an RBF kernel, and so on. A kernel function class known as "additive kernels", such as the "intersection kernel" described in Subhransu Maji, Alexander C. Berg, and Jitendra Malik, "Classification using Intersection Kernel Support Vector Machine is Efficient", In IEEE Conference on Computer Vision and Pattern Recognition, 2008 (Non-Patent Document 1), is an example of a frequently-used kernel function. The additive kernel is expressed by Formula (2).

$$K(x, y) = \sum_{d=1}^{D} k(x_d, y_d) \quad (2)$$

Here, $x_d$ and $y_d$ represent dth-dimension elements of x and y, respectively, which are D-dimensional vectors. Meanwhile, k(x, y) is a function for calculating an output value from two scalar input variables x and y.

Andrea Vedaldi, Andrew Zisserman, "Efficient Additive Kernels via Explicit Feature Maps", In IEEE Conference on Computer Vision and Pattern Recognition, 2010 (Non-Patent Document 2), discloses a specific example of an additive kernel. For example, Formula (3) expresses k(x, y) for an intersection kernel, whereas Formula (4) expresses k(x, y) for a $X^2$ kernel.

$$k(x, y) = \min(x, y) \quad (3)$$

$$k(x, y) = \frac{2xy}{x+y} \quad (4)$$

SUMMARY OF THE INVENTION

According to an embodiment of the present invention, an information processing apparatus comprises: an acquisition unit configured to acquire a multidimensional input vector; a derivation unit configured to derive, for each dimension of the input vector, a function value of a single-variable function with an element of the dimension as a variable, by referring to a lookup table indicating a correspondence between a variable and a function value of the single-variable function, wherein a product of the single-variable functions approximates a function value of a multiple-variable function; a product calculation unit configured to calculate, for each dimension of the input vector, a product of the function value derived by the derivation unit and a predetermined coefficient corresponding to the dimension; and an output unit configured to output a value calculated using the total of the products calculated by the product calculation unit for each dimension of the input vector as a classification index indicating a class of the input vector.

According to another embodiment of the present invention, an information processing method comprises: acquiring a multidimensional input vector; deriving, for each dimension of the input vector, a function value of a single-variable function with an element of the dimension as a variable, by referring to a lookup table indicating a correspondence between a variable and a function value of the single-variable function, wherein a product of the single-variable functions approximates a function value of a multiple-variable function; calculating, for each dimension of the input vector, a product of the derived function value and a predetermined coefficient corresponding to the dimension; and outputting a value calculated using the total of the calculated products for each dimension of the input vector as a classification index indicating a class of the input vector.

According to still another embodiment of the present invention, a non-transitory computer-readable medium stores a computer to perform a method comprising: acquiring a multidimensional input vector; deriving, for each dimension of the input vector, a function value of a single-variable function with an element of the dimension as a variable, by referring to a lookup table indicating a correspondence between a variable and a function value of the single-variable function, wherein a product of the single-variable functions approximates a function value of a multiple-variable function; calculating, for each dimension of the input vector, a product of the derived function value and a predetermined coefficient corresponding to the dimension; and outputting a value calculated using the total of the calculated products for each dimension of the input vector as a classification index indicating a class of the input vector.

Further features of the present invention will become apparent from the following description of exemplary embodiments (with reference to the attached drawings).

DESCRIPTION OF THE EMBODIMENTS

A kernel function $K(x,x_i)$ is calculated for each support vector when the classification function $f(x)$ is calculated as indicated in Formula (1). Accordingly, when there is a large number of support vectors, it is necessary to calculate the kernel function and execute a product-sum operation on the obtained values and parameters many times, resulting in extremely long operation times.

Maji et al. disclose a technique that reduces the amount of operation and shortens the operation time by modifying an equation for computing an intersection kernel and then performing piecewise linear approximation on nonlinear functions $h_i(s)$ obtained from the modified equation.

According to the technique disclosed by Maji et al., nonlinear functions $h_i(s)$ that differ from dimension to dimension are applied to elements in each dimension of the input vector. The classification function is then calculated by finding the sum of the nonlinear function output values. Thus according to the technique of Maji et al., it is necessary to provide a different nonlinear function $h_i(s)$ for each dimension, which in turn requires more memory. In particular, a number of lookup tables (LUT) corresponding to the number of dimensions is necessary when executing the piecewise linear approximation on the nonlinear function $h_i(s)$, and there has thus been a problem in that a large memory is required to store the lookup table. The technique disclosed by Maji et al. is furthermore designed for situations where the intersection kernel is used.

According to some embodiments of the present invention, an amount of operation and the size of a lookup table used in the operation can be reduced when calculating a classification function.

First Embodiment

An information processing apparatus according to a first embodiment is a classification apparatus that employs an additive kernel support vector machine (SVM). First, a method for calculating a classification function $f(x)$ will be described.

Figure 1:
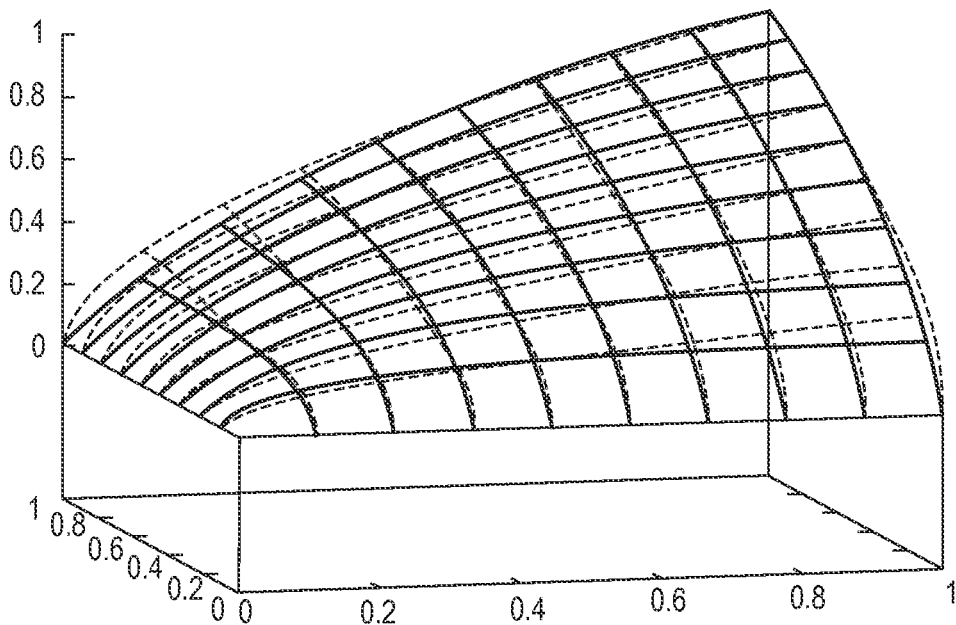
FIG. 1 is a graph of theoretical values and approximated values of k(x, y) for a $X^2$ kernel.

FIG. 1 is a graph indicating $k(x, y)$ for a $X^2$ kernel. As mentioned above, $k(x, y)$ is a function for calculating an output value from two scalar input variables x and y. In FIG. 1, the solid lines represent the values of $k(x, y)$ calculated as indicated in Formula (4). The following descriptions assume that the values of each element of the input vector x have been normalized so as to fall within a range from 0 to 1. However, it is not a requirement for the values of each element of the input vector x to be normalized so as to fall within a range from 0 to 1. For example, the values of each element of the input vector may be normalized to −1 to 1.

As shown in FIG. 1, for kernel functions such as the $X^2$ kernel, $k(x, y)$ is normally symmetrical with respect to x, y. If a certain amount of error is permitted, $k(x, y)$ can be approximated as the product of functions of each input variable (variable separable function). To be more specific, using a common one-variable function $s(x)$ for x and y, $k(x, y)$ can be approximated as indicated by Formula (5).

$$k(x,y) \approx s(x) \cdot s(y) \tag{5}$$

The broken lines in FIG. 1 represent approximated values of $k(x, y)$ in the case where $s(x)=x^{0.5644}$ in Formula (5). It can therefore be seen that the shape of $k(x, y)$ in Formula (4) can be approximated using the function $s(x)$ with a certain amount of error.

Using the approximation of Formula (5), the classification function $f(x)$ for an additive kernel that uses $k(x, y)$ can be expressed as indicated by Formula (6). Formula (6) is obtained by substituting Formulas (2) and (5) in Formula (1) and being modified. Here, a support vector $x_i$ and a dth-dimension element $x_{id}$ of the support vector $x_i$ are used for a vector y and a dth-dimension element $y_d$ of the vector y in Formula (2), respectively.

$$f(x) \approx \sum_{i=1}^{N} \alpha_i y_i \left( \sum_{d=1}^{D} s(x_d) \cdot s(x_{id}) \right) + b = \tag{6}$$

$$\sum_{d=1}^{D} \left( \sum_{i=1}^{n} \alpha_i y_i s(x_{id}) \right) s(x_d) + b = \sum_{d=1}^{D} W_d s(x_d) + b$$

Here, $w_d$ represents a coefficient that can be calculated as indicated in Formula (7).

$$w_d = \sum_{i=1}^{n} \alpha_i y_i s(x_{id}) \tag{7}$$

When the approximation of Formula (5) is used, the value of the classification function $f(x)$ is obtained by applying the function $s(x)$ to the elements in each dimension of the input vector x as indicated in Formula (6) and then executing a product-sum operation with the coefficient $w_d$. Doing so makes it possible to greatly reduce the amount of operation as compared to a case where the classification function $f(x)$ is simply calculated according to Formula (1) without applying the approximation of Formula (5). The effects of reducing the amount of operation are particularly apparent at a high support vector number n. Although $s(x)$ is a normal nonlinear function, the amount of operation involved in finding $s(x)$ can be suppressed through piecewise linear approximation using a lookup table (LUT). This lookup table indicates a correspondence relationship between variables x and function values $s(x)$, and input values are converted into converted values based on this correspondence relationship. For example, in the case where the function $s(x)$ is an exponentiation as in Formula (8), the lookup table stores exponent values of the input values as the converted values.

Figure 2:
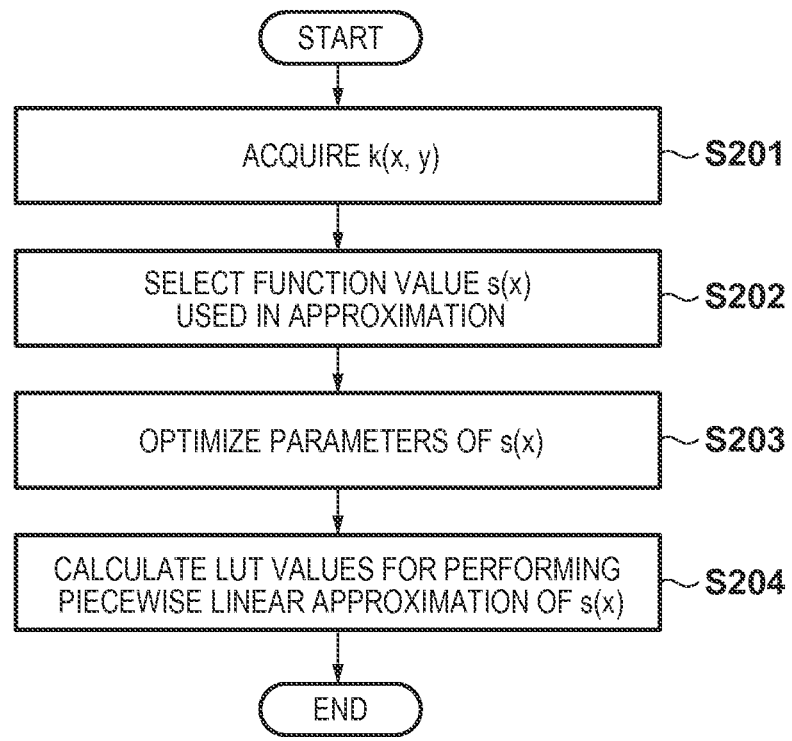
FIG. 2 is a flowchart illustrating a process for calculating s(x) and LUT values.
Figure 9:
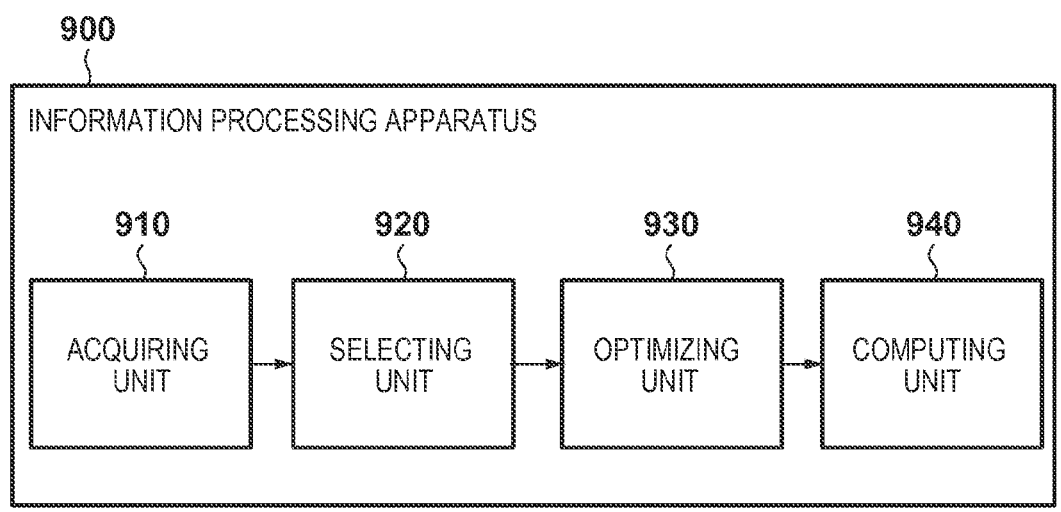
FIG. 9 is a block diagram illustrating an example of an information processing apparatus that generates a lookup table.

Next, a method for determining $s(x)$ when provided with the additive kernel function $k(x, y)$ and a method for generating a lookup table used for calculating $s(x)$ through piecewise linear approximation will be described with reference to FIG. 2. The calculation method illustrated in FIG. 2 is carried out by an information processing apparatus 900 illustrated in FIG. 9, for example.

In step S201, an acquiring unit 910 acquires the function $k(x, y)$ that constitutes the additive kernel. The acquiring unit 910 can acquire data expressing the function $k(x, y)$ input by a user, for example. $k(x, y)$ may be provided as an equation as indicated in Formulas (3) and (4), or may be provided as a number sequence obtained by sampling function values.

In step S202, a selecting unit 920 selects the function s(x) used in the approximation indicated in Formula (5). The selecting unit 920 can carry out the selection by acquiring data specifying the function s(x) input by the user, for example. The exponential function containing a parameter β indicated in Formula (8), a quadratic function containing a parameter γ indicated in Formula (9), or the like can be given as an example of the function s(x). Other functions can also be used, however, as long as they provide sufficient approximation accuracy.

$$s(x) = x^\beta \quad (8)$$

$$s(x) = \gamma x^2 + (1-\gamma)x \quad (9)$$

In step S203, an optimizing unit 930 optimizes the parameter of the function s(x) so that s(x) and s(y) approximate k(x, y) as closely as possible. A typical curve fitting technique can be used for the optimization. For example, the optimizing unit 930 can determine a parameter value for s(x) using the least squares method for a minimum degree of squared error between s(x), s(y) and k(x, y). To give a specific example, β=0.5644 is obtained as an optimum parameter through the least squares method in the case where k(x, y) found through Formula (4) is approximated using s(x) indicated by Formula (8). The optimizing unit 930 determines the function s(x) in step S203 in such a manner.

Figure 3:
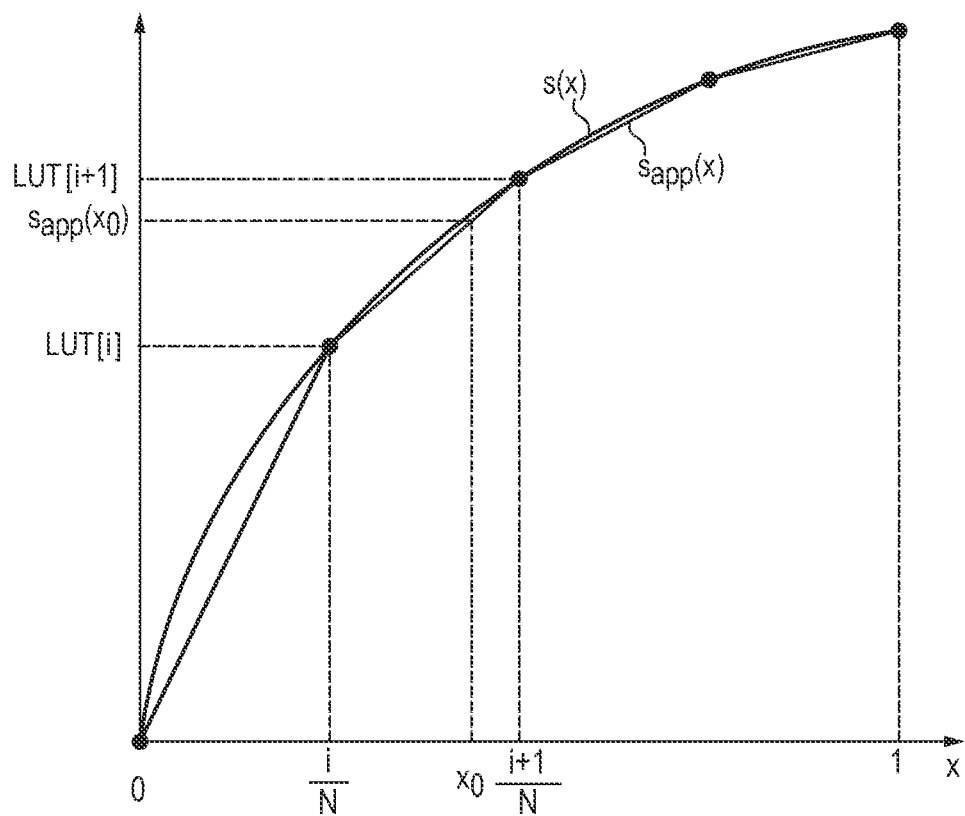
FIG. 3 is a graph indicating $s_{app}(x)$, which is a piecewise linear approximate function.

In step S204, a computing unit 940 generates a lookup table used for calculating the function s(x) determined in step S203 through piecewise linear approximation. A method for calculating LUT values that configure the lookup table will be described hereinafter with reference to FIG. 3. FIG. 3 illustrates an example of the function s(x) and a function $s_{app}(x)$ that approximates s(x). In the present embodiment, the range of the elements of the input vector is divided into N and the function s(x) is approximated as a straight line in each divided interval. In the example shown in FIG. 3, the function $s_{app}(x)$ is made of a plurality of line segments, and each line segment approximates the function s(x) in a corresponding interval obtained by dividing the range into N. In FIG. 3, the ends of the line segments are indicated by black circles, and the coordinates thereof are expressed by (i/N, s(i/N)) and ((i+1)/N, s((i+1)/N)).

The value of $s_{app}(x)$ can be found by referring to the ends of the line segments that approximate s(x) in the corresponding divided interval, or in other words, the divided interval that contains x. In the present embodiment, the computing unit 940 calculates the values of s(x) at the ends of each line segment indicated by the black circles in FIG. 3 as the LUT values.

More specifically, LUT[i], which is the ith (0≤i≤N) LUT value, can be calculated through Formula (10).

$$LUT[i] = s\left(\frac{i}{N}\right) \quad (10)$$

When the LUT values are expressed through Formula (10), the value of $s_{app}(x_0)$, which corresponds to an input value $x_0$ in the range indicated in Formula (11), can be calculated through Formula (12) using LUT[i] and LUT[i+1], which are ith and i+1th LUT values, respectively.

$$\frac{i}{N} \leq x_0 \leq \frac{i+1}{N} \quad (11)$$

$$s_{app}(x_0) = (i+1-Nx_0) \cdot LUT[i] + (Nx_0 - i) \cdot LUT[i+1] \quad (12)$$

The computing unit 940 then stores the obtained LUT values in a storage unit (not shown). A one-dimensional lookup table generated in this manner stores N+1 LUT values. A piecewise linear approximation can be found for the function s(x) across N intervals using the N+1 LUT values. The interval number N may be determined based on the required approximation accuracy or the size of the lookup table that can be used. For example, the value of N can be 8, 16, 32, 64, or 128.

In the present embodiment, the lookup table is generated by calculating the LUT values in step S204 after first optimizing the parameters of the function s(x) in step S203. However, the LUT values may express the parameters of the function s(x). For example, the LUT values that correspond to respective divided intervals may express the slope and intercept of the line segment in that divided interval. In this case, the LUT values are determined through the parameter optimization carried out in step S203, and thus step S204 is unnecessary.

Also, in step S203, the parameters are optimized so that s(x) and s(y) approximate k(x, y) as closely as possible. However, rather than optimizing the approximation accuracy of the function, the parameters may be optimized through learning in order to optimize the overall classification performance of the SVM. In this case, a technique for determining the kernel parameters through learning can be applied.

Although the computing unit 940 calculates the LUT values through the method illustrated in FIG. 3 in the present embodiment, the method for calculating the LUT values is not limited thereto. For example, the range of the elements in the input vector may be divided into nonuniform parts rather than N uniform parts. Furthermore, it is not necessary to find the line segments that approximate s(x) in each divided interval through the aforementioned method; for example, line segments that approximate s(x) may be found through the least squares method. Further still, the piecewise approximation need not be executed using a piecewise linear function (a direct function); another approximation method, such as approximation using a piecewise constant function (piecewise constant approximation), approximation using a piecewise quadratic function, or the like may be used instead. In this case, the parameters required to calculate the approximated values for each divided interval are held in the lookup table. Even in such a case, approximated values for s(x) can be calculated by, for example, an interpolation calculation unit 402 (mentioned later) referring to the parameters held in the lookup table.

Figure 4:
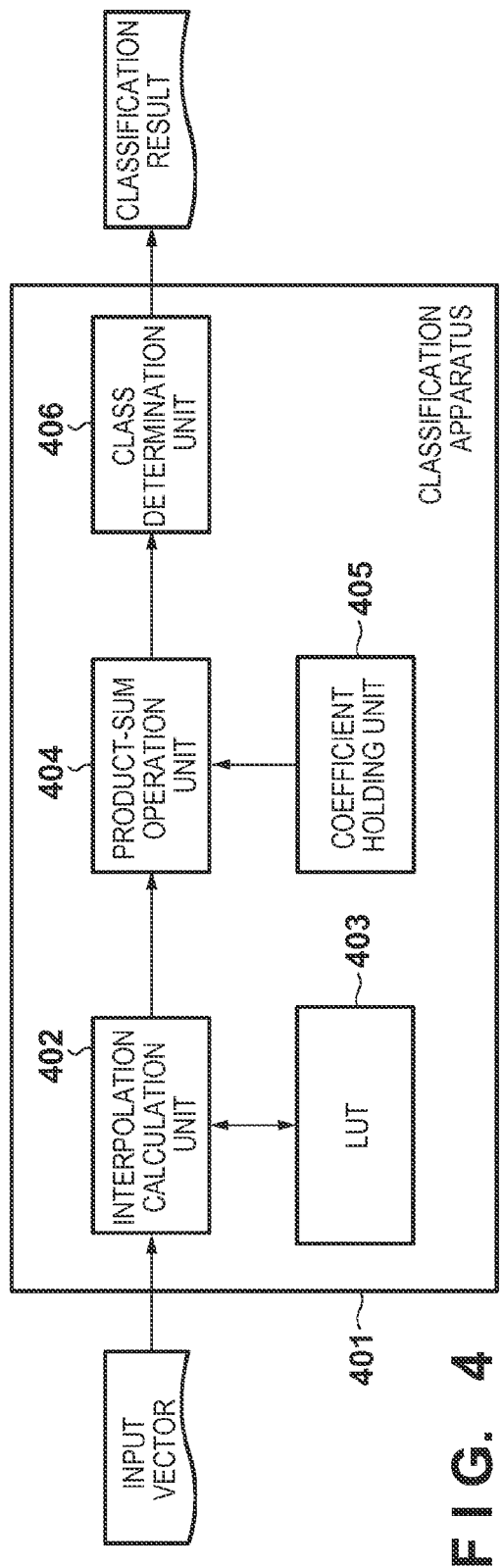
FIG. 4 is a block diagram illustrating an example of a classification apparatus according to a first embodiment.
Figure 6:
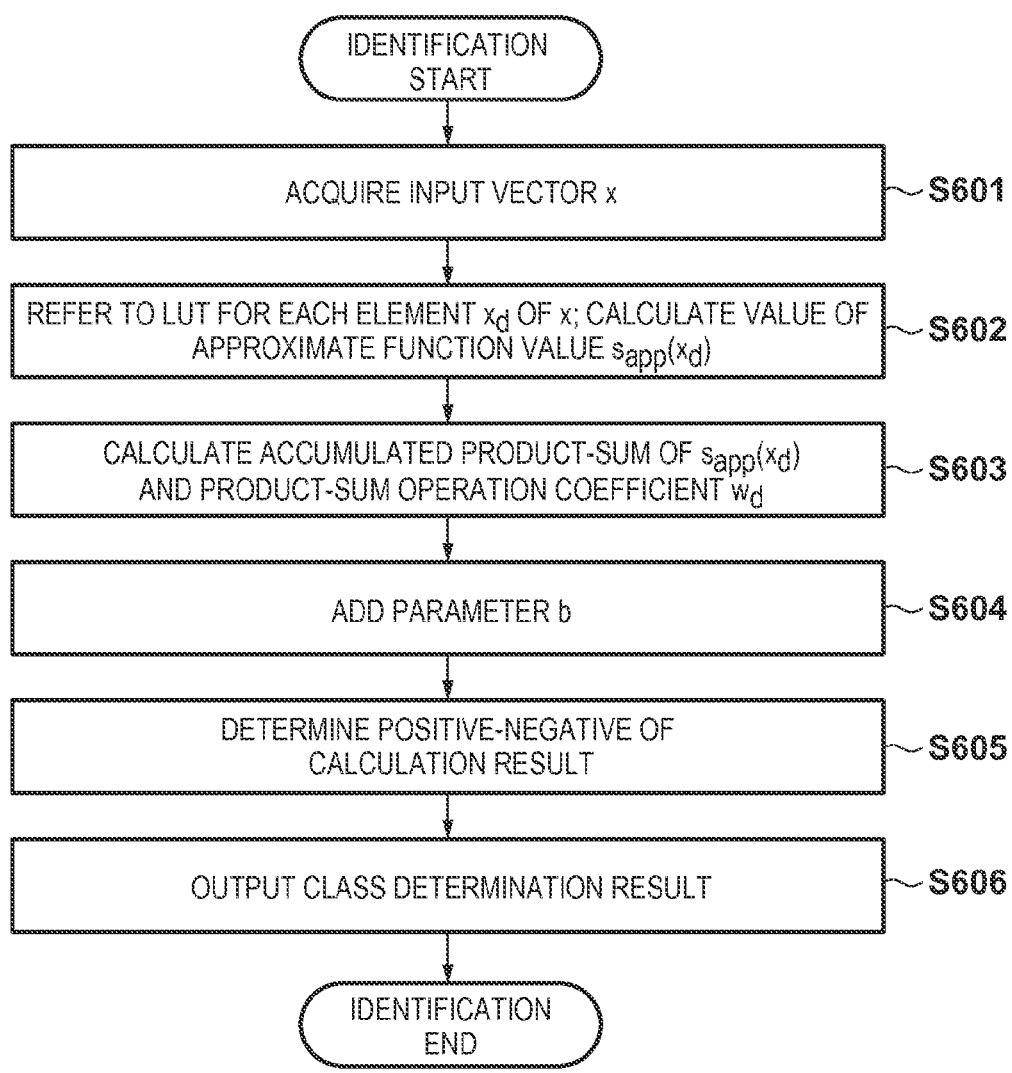
FIG. 6 is a flowchart illustrating an example of processing executed by the classification apparatus according to the first embodiment.

Next, the configuration of a classification apparatus, serving as an information processing apparatus according to the first embodiment, and processing performed thereby will be described. FIG. 4 illustrates the configuration of the classification apparatus according to the present embodiment, and FIG. 6 illustrates a flowchart of processing executed by the classification apparatus according to the present embodiment. A classification apparatus 401 classifies input vectors using a lookup table obtained through the aforementioned procedure and $w_d$ calculated in advance using Formula (7). More specifically, the classification apparatus 401 acquires the input vector x and calculates a classification index corresponding to the value of the classification function f(x) by referring to the lookup table. This classification index specifies a class of the input vector, and the classification apparatus 401 classifies the input vectors in accordance with the classification index and outputs classification results.

The classification apparatus 401 includes the interpolation calculation unit 402, an LUT 403, a product-sum operation unit 404, a coefficient holding unit 405, and a class determination unit 406.

In step S601, the interpolation calculation unit 402 acquires the multidimensional input vector x. The input vector according to the present embodiment is a D-dimensional vector, expressed as $(x_1, x_2, \ldots, x_D)$. The interpolation calculation unit 402 may acquire the input vector x through user input or from another apparatus.

In step S602, the interpolation calculation unit 402 calculates the converted values corresponding to the elements in each dimension of the input vector through interpolation calculation, referring to the LUT 403. To be more specific, the interpolation calculation unit 402 calculates the approximate function value $s_{app}(x_d)$ corresponding to the element $x_d$ ($1 \le d \le D$) in each dimension of the input vector, referring to the LUT 403. The LUT 403 is a lookup table used for calculating s(x) through an interpolation calculation, such as piecewise linear approximation, and is a lookup table that holds values such as those indicated by Formula (10), for example. This LUT 403 indicates a correspondence relationship between the element and the converted value (the approximate function value $s_{app}(x_d)$). For example, the LUT 403 holds LUT values calculated according to the method illustrated in FIG. 2. The interpolation calculation unit 402 refers to the LUT 403 and calculates $s_{app}(x_d)$ according to Formula (12). The LUT 403 is stored in a storage unit (a first storage unit, not shown) provided in the classification apparatus 401.

In step S603, the product-sum operation unit 404 calculates a product of the approximate function value $s_{app}(x_d)$ output by the interpolation calculation unit 402 (the converted value) and the coefficient $w_d$ read out from the coefficient holding unit 405 on a dimension-by-dimension basis. The product-sum operation unit 404 also finds the sum of the products calculated for each dimension by accumulating the products calculated for each dimension.

In step S604, the product-sum operation unit 404 adds a parameter value b indicating an offset to the accumulated value obtained in step S603. A classification index corresponding to the value of the classification function f(x) indicated in the following Formula (13) is obtained through the operations performed in step S603 and step S604, and the product-sum operation unit 404 outputs the classification index to the class determination unit 406.

$$f(x) = \sum_{d=1}^{D} w_d s_{app}(x_d) + b \quad (13)$$

The coefficient holding unit 405 holds the coefficients $w_d$ corresponding to each dimension of the input vector along with the parameter b indicating the offset. The coefficient $w_d$ is calculated in advance as indicated in Formula (7), and is held in a storage unit such as the coefficient holding unit 405 (a second storage unit). Alternatively, the LUT 403 may be stored in the same storage unit as the coefficient $w_d$ and the parameter b.

As described above, the coefficient $w_d$ is calculated from a parameter $\alpha_i$ determined through learning (a learning result), the support vector $x_i$ element for the dimension d, and a supervisory label $y_i$. The parameter b is also a learning result determined through learning. These values can be calculated through conventional techniques. The product-sum operation unit 404 reads out and uses the coefficients and parameters from the coefficient holding unit 405.

In step S605, the class determination unit 406 compares the classification index calculated by the product-sum operation unit 404 in step S604 with a predetermined threshold. 0 is normally used as the threshold, but the threshold is not limited thereto. Then, in step S606, the class determination unit 406 outputs a result of the comparison performed in step S605, or in other words, the magnitude relationship between the threshold and the value of the classification function f(x), as a classification result for the input vector x.

Therefore, with the classification apparatus 401 according to the present embodiment, the amount of operation when obtaining a value of an additive kernel SVM classification function f(x) can be greatly reduced as compared to a case where Formulas (1) and (2) are used as-is without carrying out approximation. Furthermore, while the method disclosed in Non-Patent Document 1 requires a different lookup table for each dimension, the classification apparatus 401 according to the present embodiment can obtain the value of the classification function f(x) using one type of lookup table common across each dimension. Accordingly, the overall size of the lookup table held by the classification apparatus 401 can be greatly reduced. Further still, the method disclosed in Non-Patent Document 1 is a technique applied to intersection kernels. However, the classification apparatus 401 according to the present embodiment can be applied generally in classification using various additive kernels not limited to intersection kernels, as long as the approximation indicated in Formula (5) can be permitted.

Second Embodiment

Next, a regression apparatus that calculates a regression value using an additive kernel support vector regression (SVR), serving as an information processing apparatus according to a second embodiment, will be described. The classification function f(x) and the approximation method thereof are the same as in the first embodiment and thus descriptions thereof will be omitted.

Figure 5:
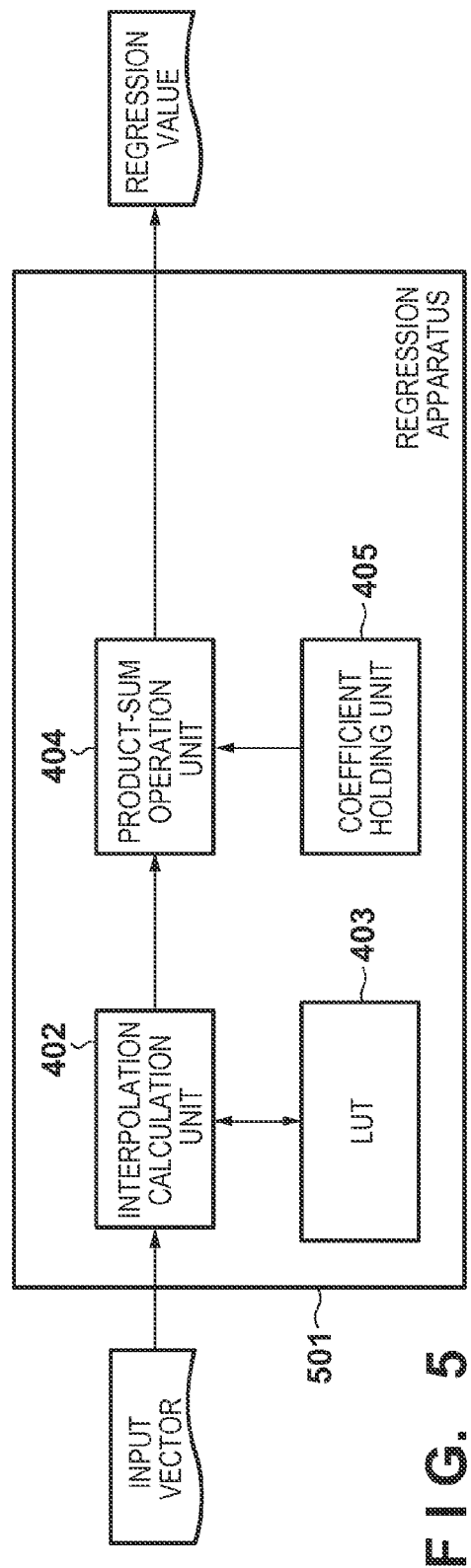
FIG. 5 is a block diagram illustrating an example of a regression apparatus according to a second embodiment.

FIG. 5 illustrates the configuration of a regression apparatus 501 according to the second embodiment. The regression apparatus 501 acquires the input vector x, acquires the value of the classification function f(x), and outputs the acquired value as the regression value. The configuration of the regression apparatus 501 corresponds to the classification apparatus 401 of the first embodiment with the class determination unit 406 omitted, and the regression apparatus 501 outputs the classification index calculated by the product-sum operation unit 404 as the regression value. The configurations of and operations performed by the interpolation calculation unit 402, the LUT 403, the product-sum operation unit 404, and the coefficient holding unit 405 are the same as in the first embodiment, and thus descriptions thereof will be omitted.

According to the second embodiment, the amount of operation and the size of the lookup table can be reduced for a regression apparatus for SVR calculation, through the same principles as in the first embodiment.

As described above, the only difference between the classification apparatus according to the first embodiment and the regression apparatus according to the second embodiment lies in the presence or absence of the class determination unit 406. Accordingly, the classification apparatus according to the first embodiment can also be used as a regression apparatus for calculating a regression value for the input vector x. In this case, the classification apparatus according to the first embodiment may include a switching unit (not shown) that controls whether or not to use the class determination unit 406. Providing such a switching unit makes it possible to switch the operations performed by the classification apparatus according to the first embodiment so that the classification apparatus outputs a classification result or a regression value.

Third Embodiment

A third embodiment will describe a method for realizing the classification apparatus according to the first embodiment using a generic information processing apparatus. The classification function f(x) and the approximation method thereof are the same as in the first embodiment and thus descriptions thereof will be omitted.

Figure 8:
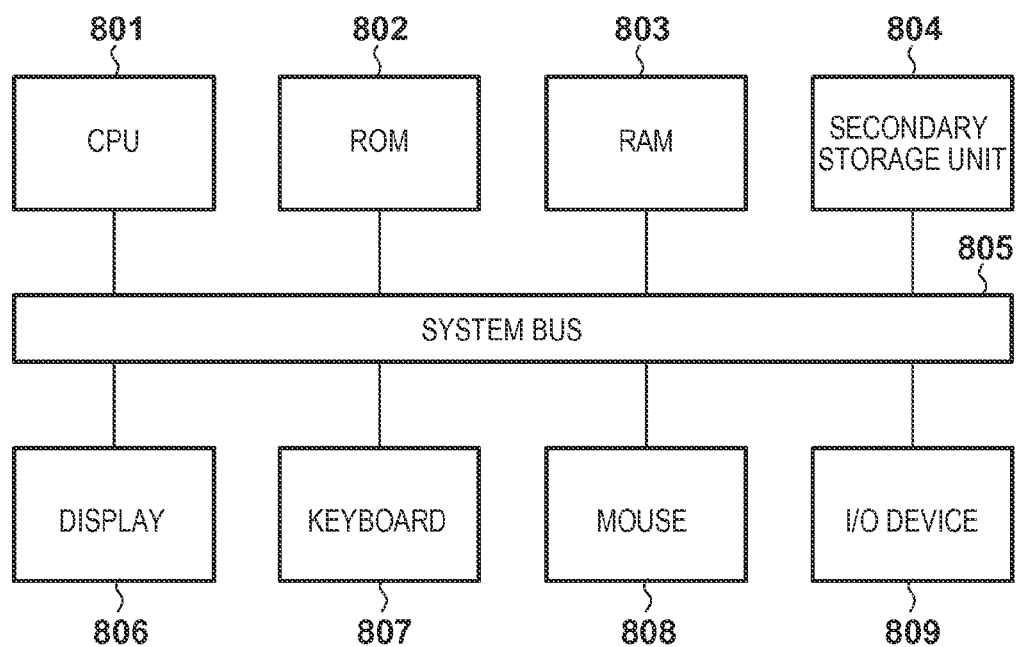
FIG. 8 is a block diagram illustrating an example of an information processing apparatus according to a third embodiment.

FIG. 8 is a diagram illustrating an example of the hardware configuration of the information processing apparatus according to the third embodiment. Note that FIG. 8 illustrates the configuration of a personal computer, which is the most typical type of information processing apparatus. However, the information processing apparatus according to the present embodiment may be a built-in device, a digital camera, a handheld device, or the like, for example.

A CPU 801 executes various types of programs, including processing corresponding to the flowchart illustrated in FIG. 6, and controls the various units in the information processing apparatus. A ROM 802 is a non-volatile memory that stores programs and the like required during initial operations of the information processing apparatus. A RAM 803 is a volatile memory that provides a work area for the CPU 801 and temporarily stores programs and the like read out from a secondary storage unit 804. The secondary storage unit 804 stores programs used by the CPU 801. More specifically, the functions of the various units illustrated in FIG. 4 and the processes illustrated in FIG. 6 are realized by programs being read out from a storage medium such as the secondary storage unit 804 into the RAM 803 and the CPU 801 operating in accordance with the computer programs read out into the RAM 803.

The devices 801 to 804 exchange information via a system bus 805. The information processing apparatus is also connected to a display 806, a keyboard 807, a mouse 808, and an I/O device 809 via the system bus 805. The display 806 can be used to display information such as processing results, the progress of processes being carried out, and so on to the user. The keyboard 807 and the mouse 808 are used to input user instructions into the information processing apparatus. A communication device that serves as a communication interface with the exterior, an input device such as a camera or a scanner, an output device such as a printer, or the like can be given as examples of the I/O device 809.

According to the third embodiment, the amount of operation and the size of the lookup table can be reduced even in the case where the input vector x classification is carried out using a software program. Reducing the size of the lookup table increases the hit rate of the CPU cache when executing the software program, increasing the speed of execution as compared to a case where the lookup table has a large size.

The third embodiment describes a method for realizing the classification apparatus according to the first embodiment using a generic information processing apparatus. However, an SVR calculation can be performed, in other words, the regression apparatus according to second embodiment can be realized as well, by omitting the process of step S605 in FIG. 6 and outputting the classification index calculated by the product-sum operation unit 404 as a regression value.

Fourth Embodiment

Next, a classification apparatus that uses an additive kernel SVM, serving as an information processing apparatus according to a fourth embodiment, will be described. In the first embodiment, a common function k(x, y) and $s_{app}(x)$ are used for each dimension of the input vector. However, in the fourth embodiment, a plurality of functions $k_j(x, y)$ and $s^j_{app}(x)$ are used individually.

Here, D dimensional indices d (d=1, 2, . . . , D) indicating each dimension of the a D-dimensional input vector are divided into M non-overlapping sets $S_j$ (j=1, 2, . . . , M). Normally, 1≤M<D in order to reduce the number of lookup tables, which will be described later. When a dimensional index belongs to a set $S_j$, $k_j(x, y)$ is used as the function k(x, y) that constitutes the additive kernel. Here, different functions can be used as $k_j(x, y)$ for each instance of j.

Let us assume that a kernel function $K_j(x, y)$ (j=1, 2, . . . , M) is defined for each dimension belonging to a set $S_j$. Thus $K_j(x, y)$ can be expressed as indicated by Formula (14).

$$K_j(x, y) = \sum_{d \in S_j} k_j(x_d, y_d) \tag{14}$$

If the linear sum of $K_j(x, y)$ is taken as a new kernel function, K(x, y) can be expressed as indicated by Formula (15).

$$K(x, y) = \sum_{j=1}^{M} \beta_j K_j(x, y) \tag{15}$$

Here, a weighting coefficient $\beta_j$ meets the following conditions.

$$\beta_j \geq 0 \tag{16}$$

$$\sum_{j=1}^{M} \beta_j = 1 \tag{17}$$

The kernel function expressed in the form indicated in Formulas (15) to (17) can be learned through the Multiple Kernel Learning technique. It will be assumed hereinafter that the coefficients necessary for calculating the classification function f(x) are found through learning.

An approximate function $s^j(x_d)$ used to approximate the function $k_j(\cdot, y)$ can be found for each function $k_j(x, y)$ in the same manner as in the first embodiment. Likewise, an approximate function $s^j_{app}(x)$ that approximates the function $s^j(x_d)$ can be found in the same manner as in the first embodiment. Furthermore, lookup tables $LUT_j$ (j=1, 2, . . . M) used to calculate the approximate function $s^j_{app}(x)$ can be generated in the same manner as in the first embodiment.

The classification function f(x) in this case can be expressed as indicated in Formulas (18) and (19) using the approximation indicated in Formula (20). Like Formula (6) in the first embodiment, Formulas (18) and (19) can be obtained by substituting Formulas (14), (15), and (5) in Formula (1) and being modified.

$$f(x) = \sum_{j=1}^{M} \sum_{d \in S_j} w_d s^j_{app}(x_d) + b \tag{18}$$

-continued $$w_d = \sum_{i=1}^{n} \alpha_i y_i \beta_j s^j(x_{id}), \text{ wherein } d \in S_j \quad (19)$$

$$k_j(x, y) \approx s^j(x) \cdot s^j(y) \quad (20)$$

$LUT_j$ is a lookup table that holds values necessary for calculating $s^j_{app}(x_d)$ for a corresponding j. Each lookup table $LUT_E$ generated in this manner stores N+1 LUT values. A piecewise linear approximation can be performed for the function $s^j(x)$ across N intervals using the N+1 LUT values. The total number of lookup tables is M (four, in FIG. 7). However, the interval number N need not be the same for all $LUT_j$.

As indicated above, each of the D dimensions is associated with one of the M lookup tables. More specifically, in the case where the dimensional index d belongs to the set $S_j$, $LUT_j$ is associated with the dth dimension.

Figure 7:
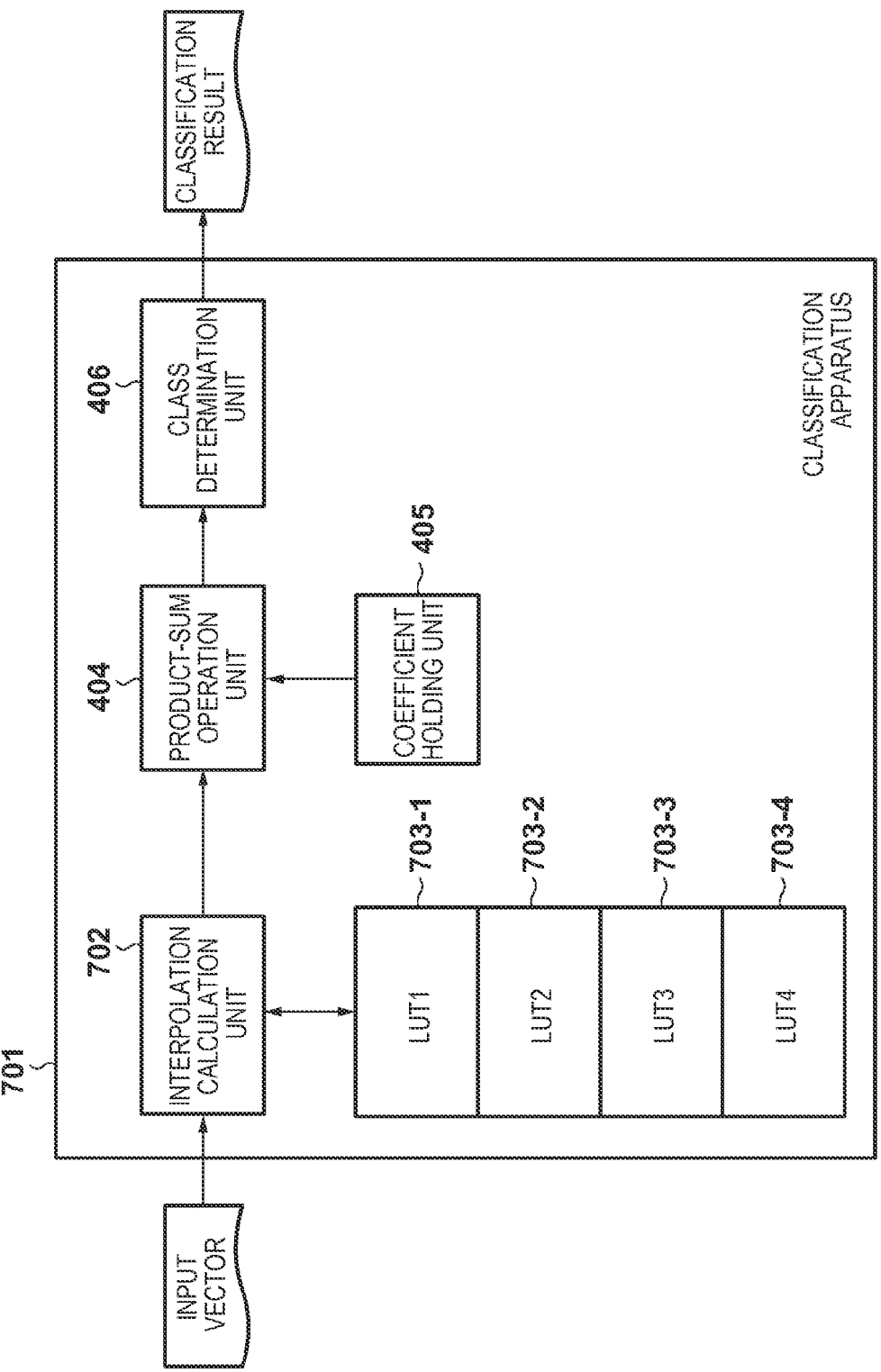
FIG. 7 is a block diagram illustrating an example of a classification apparatus according to a fourth embodiment.

Next, the configuration of a classification apparatus, serving as an information processing apparatus according to the fourth embodiment, and processing performed thereby will be described. FIG. 7 illustrates the configuration of the classification apparatus according to the present embodiment. A classification apparatus 701 includes an interpolation calculation unit 702, M lookup tables 703-1, 703-2, 703-3, and 703-4, the product-sum operation unit 404, the coefficient holding unit 405, and the class determination unit 406.

The classification apparatus 701 classifies input vectors using lookup tables obtained as described above and $w_d$ calculated in advance. The processing performed in the fourth embodiment is similar to the processing in the first embodiment and described in FIG. 6, and thus the following will describe only the differences. In the present embodiment, it is assumed that four functions $k_j(x, y)$ are used (M=4). However, the method according to the present embodiment is not limited to a case where M=4.

In step S601, the interpolation calculation unit 702 acquires the multidimensional input vector x, in the same manner as the interpolation calculation unit 402 of the first embodiment.

In step S602, the interpolation calculation unit 702 determines which $k_j(x, y)$ function to use for the element $x_d$ in each dimension of the input vector x. To rephrase, the interpolation calculation unit 702 determines which set $S_j$ the dimensional index d belongs to, for the element $x_d$ in each dimension of the input vector x. This determination can be carried out by, for example, referring to a storage unit (not shown) that stores data indicating which set $S_j$ each dimensional index d belongs to.

Next, the interpolation calculation unit 702 refers to the lookup table 703-j corresponding to the element $x_d$ in each dimension of the input vector x and calculates the approximate function value $s_{app}(x_d)$. The lookup table 703-j corresponds to $LUT_j$ and stores the LUT values of $LUT_j$. The M lookup tables 703-j are stored in a storage unit (not shown) provided in the classification apparatus 701. The calculation of the approximate function value $s_{app}(x_d)$ using the lookup table 703-j can be carried out through an interpolation calculation in the same manner as in the first embodiment.

In step S603, the product-sum operation unit 404 calculates a product of the approximate function value $s^j_{app}(x_d)$ output by the interpolation calculation unit 702 and the coefficient $w_d$ read out from the coefficient holding unit 405 on a dimension-by-dimension basis, and accumulates the products obtained in each dimension. In step S604, the product-sum operation unit 404 adds the parameter value b indicating an offset to the accumulated value obtained in step S603. A classification index corresponding to the value of the classification function f(x) indicated in Formula (18) is obtained through the operations performed in steps S603 and S604.

The coefficient holding unit 405 holds the coefficients $w_d$ corresponding to each dimension of the input vector along with the parameter b indicating the offset. The coefficient and parameter can be calculated through learning using a conventional technique, as mentioned above.

In step S605 and step S606, the class determination unit 406 compares the classification index obtained in step S604 with a threshold and outputs a classification result for the input vector x, in the same manner as in the first embodiment.

Thus with the classification apparatus 701 according to the fourth embodiment, a plurality of $k_j(x, y)$ functions can be used on a dimension-by-dimension basis by using the M lookup tables 703-j. This makes it possible to increase the classification accuracy as compared to the first embodiment. Meanwhile, although a plurality (M) of lookup tables are used in the fourth embodiment, the value of M is lower than the number of dimensions D in the input vector, and thus the overall size of the lookup table can be made lower than with the method described in Non-Patent Document 1.

Finally, although the fourth embodiment describes a classification apparatus, a regression apparatus for SVR calculation in the same manner as in the second embodiment can also be realized using a similar configuration as the fourth embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiment of the present invention, and by a method performed by the computer of the system or apparatus by, for example, reading out and executing the computer executable instructions from the storage medium to perform the functions of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-076455, filed Apr. 1, 2013, which is hereby incorporated by reference herein in its entirety.

What is claimed is:

1. An information processing apparatus comprising:
   one or more hardware processors;
   a memory having stored thereon a lookup table indicating a correspondence between a variable and a function value of a single-variable function, wherein a product of a plurality of function values of the single-variable function approximates a function value of a multiple-variable function to reduce the size of the lookup table in the memory, and wherein the memory further has stored thereon instructions that, when executed by the one or more hardware processors, cause the information processing apparatus to:
   acquire a multidimensional input vector;
   derive a plurality of function values of the single-variable function with an element of the dimension as a variable for respective dimensions of the multidimensional input vector, by referring to the lookup table to increase the speed of execution of the instructions by the one or more hardware processors;
   calculate, for each dimension of the multidimensional input vector, a product of the derived function value and a predetermined coefficient corresponding to the dimension;
   calculate a total of products calculated for respective dimensions of the multidimensional input vector;
   classify the multidimensional input vector into a class by comparing the total of the products with a predetermined threshold; and
   output a classification index indicating the class of the multidimensional input vector.

2. The information processing apparatus according to claim 1,
   wherein the instructions further cause the information processing apparatus to refer to a lookup table that is common across the dimensions of the multidimensional input vector.

3. The information processing apparatus according to claim 1,
   wherein the multidimensional input vector is a D-dimensional vector;
   wherein the memory stores M (where 1≤M<D) lookup tables and each of the D dimensions corresponds to one of the M lookup tables; and
   wherein the instructions further cause the information processing apparatus to derive the function value by referring to the lookup table corresponding to the dimension for each dimension of the multidimensional input vector.

4. The information processing apparatus according to claim 1,
   wherein the lookup table stores an input value to the power of a predetermined value as a function value corresponding to that input value.

5. The information processing apparatus according to claim 1,
   wherein the lookup table indicates a correspondence between a variable x and a function value s(x); and
   wherein a product of s(x) and s(y) approximates a function k(x, y), s(x) is a single-variable function, the function k(x, y) provides a value for two scalar input variables x and y, and a kernel function expressed by Formula (2) includes the function k(x, y), and, in Formula (2), $x_d$ represents an element of a dth dimension of a vector x and $y_d$ represents an element of the dth dimension of a vector y $$K(x, y) = \sum_{d=1}^{D} k(x_d, y_d). \quad (2)$$

6. The information processing apparatus according to claim 1,
   wherein the instructions further cause the information processing apparatus to calculate the coefficient for each dimension using an element for that dimension of a support vector, a learning result, and a supervisory label.

7. The information processing apparatus according to claim 1,
   wherein the instructions further cause the information processing apparatus to derive the function values through piecewise linear approximation using values stored in the lookup table.

8. The information processing apparatus according to claim 1,
   wherein the instructions further cause the information processing apparatus to derive the function values through piecewise constant approximation using values stored in the lookup table.

9. The information processing apparatus according to claim 1,
   wherein the information processing apparatus is a classification apparatus that classifies the multidimensional input vector with a support vector machine.

10. The information processing apparatus according to claim 1,
    wherein the information processing apparatus calculates the classification index as a regression value with support vector regression.

11. The information processing apparatus according to claim 1,
    wherein the multidimensional input vector indicates an image, and the instructions further cause the information processing apparatus to classify the image indicated by the multidimensional input vector.

12. An information processing method comprising:
    acquiring, by one or more processors, a multidimensional input vector;
    storing, in a memory, a lookup table indicating a correspondence between a variable and a function value of the single-variable function, wherein a product of a plurality of function values of the single-variable function approximates a function value of a multiple-variable function to reduce the size of the lookup table in the memory;
    deriving, by the one or more processors, a plurality of function values of a single-variable function with an element of the dimension as a variable for respective dimensions of the multidimensional input vector, by referring to the lookup table to increase the speed of execution of the information processing method by the one or more processors;
    calculating, by the one or more processors, for each dimension of the multidimensional input vector, a product of the derived function value and a predetermined coefficient corresponding to the dimension;
    calculating, by the one or more processors, a total of products calculated for respective dimensions of the multidimensional input vector;

classifying, by the one or more processors, the multidimensional input vector into a class by comparing the total of the products with a predetermined threshold; and outputting, by the one or more processors, a classification index indicating the class of the multidimensional input vector.

13. A non-transitory computer-readable medium storing a lookup table indicating a correspondence between a variable and a function value of a single-variable function, wherein a product of a plurality of function values of the single-variable function approximates a function value of a multiple-variable function to reduce the size of the lookup table in the memory, and computer-executable instructions which cause a computer to perform a method comprising:

acquiring a multidimensional input vector;

deriving, a plurality of function values of the single-variable function with an element of the dimension as a variable for respective dimensions of the multidimensional input vector, by referring to the lookup table to increase the speed of execution of the method by the computer;

calculating, for each dimension of the multidimensional input vector, a product of the derived function value and a predetermined coefficient corresponding to the dimension;

calculating a total of products calculated for respective dimensions of the multidimensional input vector;

classifying the multidimensional input vector into a class by comparing the total of the products with a predetermined threshold; and outputting a classification index indicating the class of the multidimensional input vector.

* * * * *